United States Patent [19]

Beaurain

[11] 4,026,654

[45] May 31, 1977

[54] SYSTEM FOR DETECTING THE PRESENCE OF A POSSIBLY MOVING OBJECT

[75] Inventor: Pierre Beaurain, Vitry sur Seine, France

[73] Assignee: Engins Matra, Paris, France

[22] Filed: Sept. 24, 1975

[21] Appl. No.: 616,403

Related U.S. Application Data

[63] Continuation-in-part of Ser. No. 404,700, Oct. 9, 1973, abandoned.

[30] Foreign Application Priority Data

Oct. 9, 1972 France .............................. 72.35731

[52] U.S. Cl. ..................................... 356/5; 180/98; 340/1 T; 340/33; 340/38 P; 340/38 S; 343/5 PD; 343/6 ND; 343/112 CA; 356/28
[51] Int. Cl.² ......................... G01C 3/08; G01S 9/66
[58] Field of Search ........... 356/4, 5, 28; 343/5 PD, 343/6 ND, 112 CA; 340/1 T, 33, 38 P, 38 S; 180/98

[56] References Cited

UNITED STATES PATENTS

| 3,600,090 | 8/1971 | Wood et al. ........................... 356/5 |
| 3,604,805 | 9/1971 | Scott ..................................... 356/5 |
| 3,760,414 | 9/1973 | Nicolson ...................... 343/112 CA |
| 3,892,483 | 7/1975 | Saufferer ............................... 356/4 |

Primary Examiner—Maynard R. Wilbur
Assistant Examiner—S. C. Buczinski
Attorney, Agent, or Firm—Kinzer, Plyer, Dorn & McEachran

[57] ABSTRACT

A system for detecting the distance L between two objects A and B, either or both of which may be in motion, comprising approach detector means and proximity detector means operational within overlapping distance ranges; each detector means includes an emitter mounted on a first one of the objects, which radiates a primary signal toward the second object, a responder on the second object, which radiates a similar secondary signal back toward the first object, and a signal comparator for measuring the time differential between the primary and secondary signals to determine the distance L between the objects. A range switch coupled to both comparators develops an output indicative of the distance L within a comprehensive distance range encompassing both the approach range and the proximity range and extending down to zero distance.

17 Claims, 14 Drawing Figures

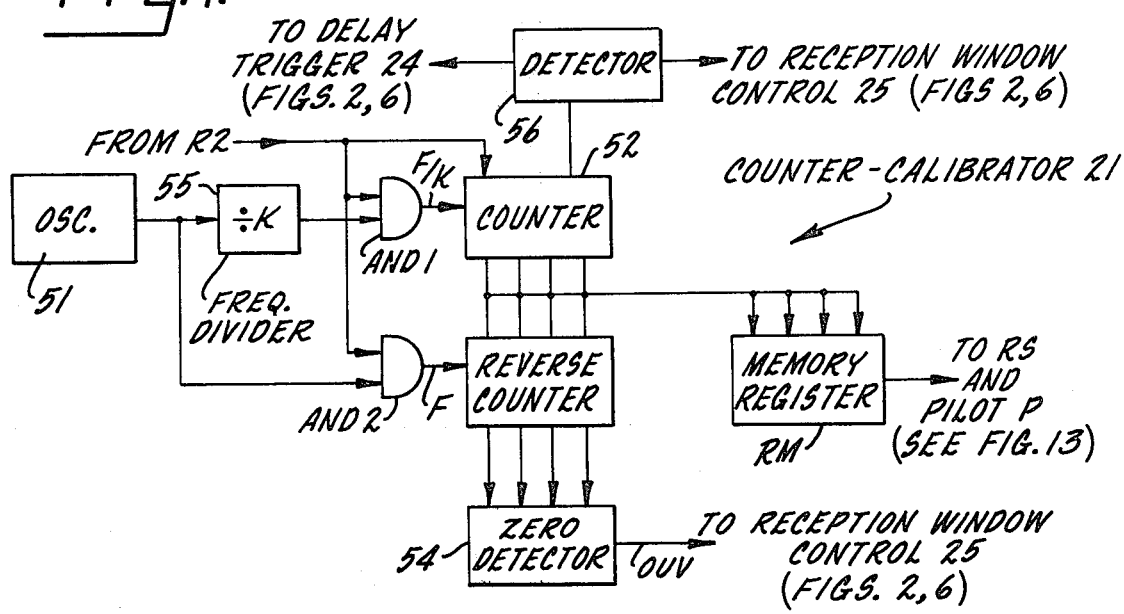
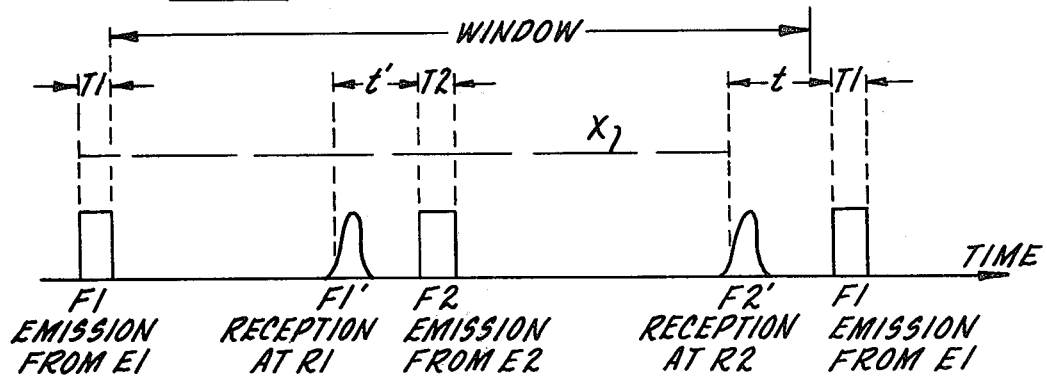
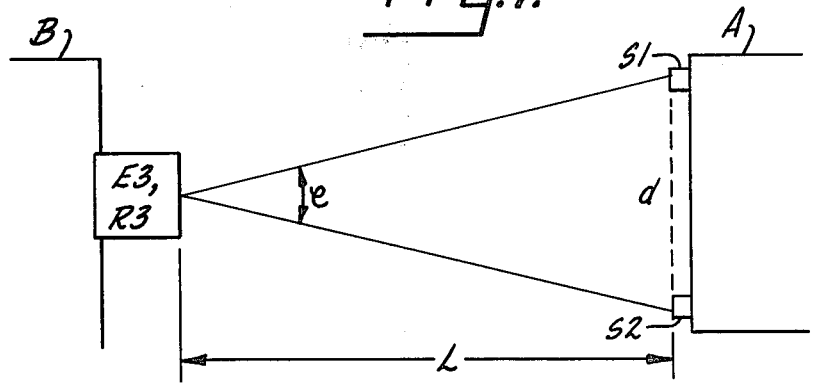

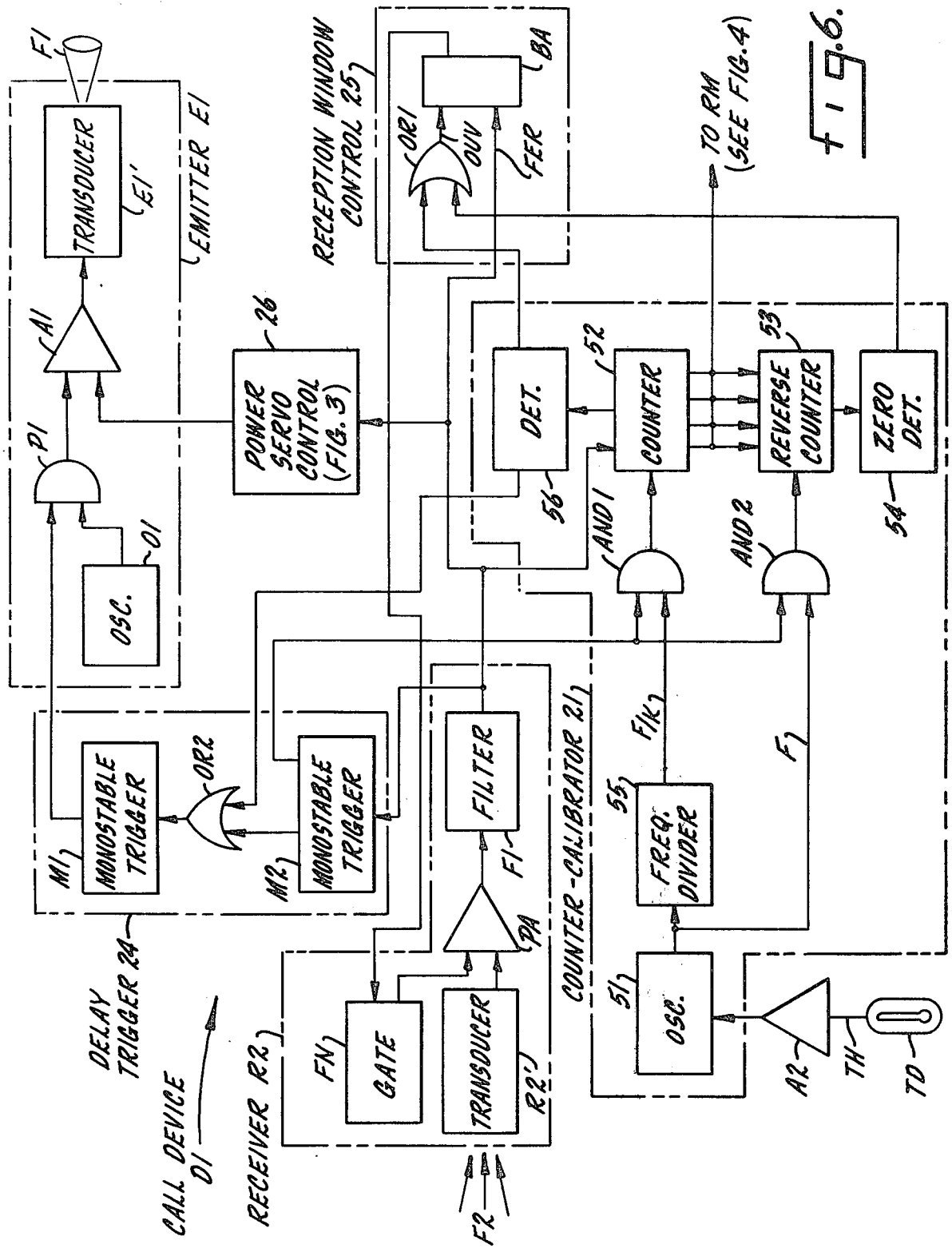

SYSTEM FOR DETECTING THE PRESENCE OF A POSSIBLY MOVING OBJECT

CROSS-REFERENCE TO RELATED APPLICATION

This application is a continuation-in-part of application Ser. No. 404,700 filed Oct. 9, 1973, now abandoned.

BACKGROUND OF THE INVENTION

The present invention relates to a high-resolution system and method for presence detection, and in particular to a system for precision detection of the distance between two objects, either or both of which may be in motion.

A large number of systems for detecting the presence of an object and the distance to it are already known. These systems have certain disadvantages which limit their effectiveness when used for measuring distances of between zero and fifty to one hundred meters. Thus, known systems often have a marked directionality requiring precise alignment between the two objects. Moreover, these systems are generally quite expensive and rather fragile, which makes it impossible to use them on board vehicles that are subject to shocks and sudden movement. Further, the known systems require many precautions to be taken in their use because they are quite sensitive to noise.

In summary, no system known to applicant can cover a range from 0 to 50 meters and satisfy the following conditions:
a. good measuring emission dynamics without a signal guide between the objects subject to measurement,
b. precision measurement over the whole range,
c. a measuring rate which varies with the use of the system,
d. and a large useful field, not requiring precise alignment between the objects.

SUMMARY OF THE INVENTION

A principal object of the present invention is to overcome these disadvantages and to provide a high-resolution presence and distance detection system operable over a range between 0 and 50 to 100 meters, depending on atmospheric conditions, which system is of simple and robust construction, little sensitive to noise, requires no antenna, and is not hindered in operation by essentially similar measuring instruments travelling from the opposite direction and operating at the same time.

The invention is particularly intended to provide a distance detection system between two vehicles, one of which constitutes the target and the other the following vehicle, this distance being measured precisely from 50 meters down to 0 (contact between the vehicles). One feature of the invention is the use of two detectors, an approach detector and a proximity detector, having overlapping detector ranges; the two detectors are coupled to a range switch that develops a distance indication over a comprehensive range encompassing both detector ranges.

It is particularly advantageous that the approach detector be an ultrasonic detector and the proximity detector be a wave beam scanning device, such as a light beam. An ultrasonic approach detector has the advantage that the signal emitted has a propagation velocity compatible with the operating rate. This propagation velocity can easily be measured by simple means. Moreover, and particularly when the approach detector comprises a call device emitting a primary signal on one frequency and a response device emitting a return signal on another frequency, excellent emission and receiver selectivity is obtained. It is thus possible to mount a call device at the head of each vehicle and a response device at the rear of each vehicle. In this way, even when the vehicles pass one another, that is to say when the call devices of the two vehicles emit toward one another, each cannot receive erroneous signals emitted by the other since each call device receiver is adjusted to receive the emission frequencies of the response device. In addition, in the case when the measuring system according to the invention is used in a transport system moving along its own tracks, for instance, in tunnels, the signals emitted and particularly well guided by the walls of the tunnel, by reflection, without requiring any particular preparation of these walls.

To enable operation to be precise, and to minimize or eliminate noise interference, it is advantageous to servo-control the approach detector emitter and to receive the emission by actuating the receiver to define a reception "window." The power servo-control may comprise a device which can control a given number of characteristic emission signals, at a given power level, a comparator which compares the power of the signal received with two limit values, and a counter which can be set in at least three positions by signals from the comparator to actuate a signal calibrator. The calibrator, which is connected to the emitter, controls the emission of the selected signal, the calibration adjustment being made step-by-step in accordance with the signal received by the receiver, following each emission. This servo-control can be continuous.

The light-beam proximity detector, when operating over a given range (e.g., between 0 and 4 to 5 meters, depending on atmospheric conditions) has a number of advantages which combine simplicity of embodiment with precision of measurement. Moreover, the proximity detection device enables a real "zero" to be obtained, which is of considerable advantage when the measurement is used in a servo-control arrangement wherein the moving objects are maintained separated by a fixed distance. For example, the objects (vehicles) may be maintained in contact, by simple servo-control of the vehicle drive, without exerting any push or pull between the vehicles. In addition, over short distances, the optical proximity detector is particularly immune to noise disturbance.

Preferably, the proximity detector emitter is a light source, such as a laser diode, controlled by an oscillator acting by means of a wave shaping device and a power stage. The response device of the proximity detector may comprise two reflecting elements, such as catadioptric reflectors, which send the received light signal back in the direction of the emission source. The optical proximity receiver may comprise a photodiode fitted with a filter delimiting a narrow band adjusted to the light source of the emitter; limiting apparatus defines the angular receiving field $\phi$ of the receiver. A particularly advantageous embodiment includes a scanning apparatus employing a double mirror for emitting and receiving light which revolves simultaneously about an axis at a defined angular velocity, the emitter and the receiver being at fixed points on the scanning axis.

BRIEF DESCRIPTION OF THE DRAWINGS

FIG. 4 is a simplified block diagram of the control for opening the window of the approach detector for the apparatus of FIGS. 1 and 2;

FIG. 5 is a graph showing the chronological succession of impulses during emission and reception in operation of the approach detector of FIG. 2;

FIG. 6 is the general schematic diagram of the call device of the approach detector of FIG. 2;

FIG. 7 is a graphic illustration of the manner in which the proximity detector operates in one embodiment of the invention;

DESCRIPTION OF THE PREFERRED EMBODIMENTS

Figure 1:
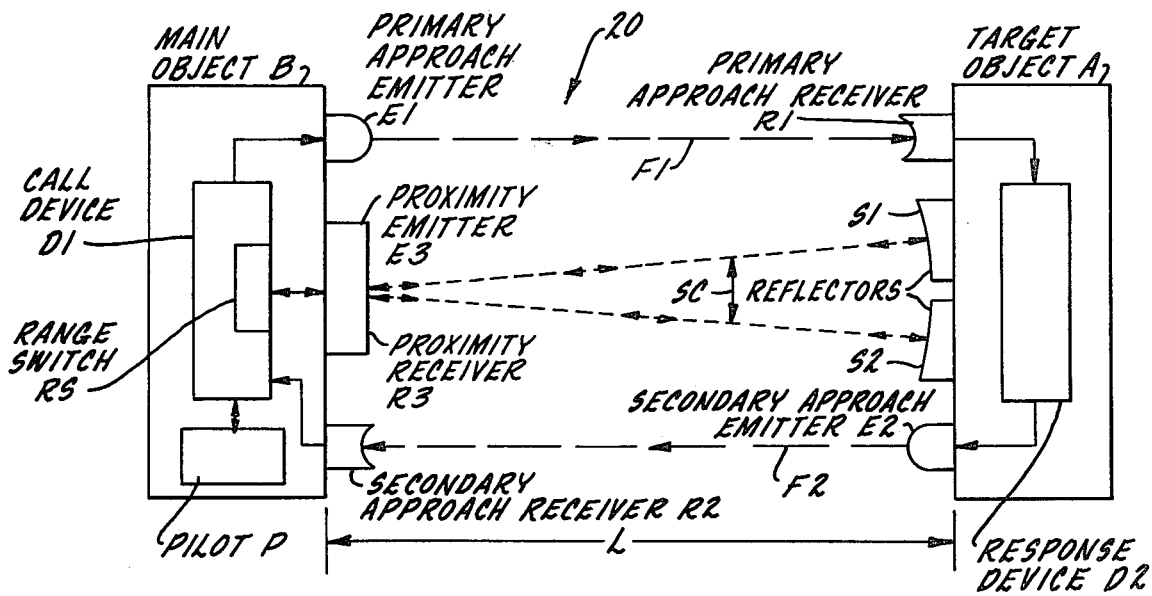
FIG. 1 is a detection system constructed in accordance with one embodiment of the invention, showing particularly the emission and reception paths for the approach detector and the proximity detector.

FIG. 1 affords a general, simplified illustration of a high-resolution distance detection system 20 for detecting the approach of one object B relative to another object A and for determining the distance L between the two objects. The one object B, identified in FIG. 1 is the main object, is usually in motion toward object A, sometimes referred to as the target object. Target object A may itself be moving, either toward or away from object B; on the other hand, either one of the objects may be stationary. System 20 is particularly applicable to situations in which either or both objects are in motion as, for example, for piloting two vehicles (e.g., railroad vehicles) toward one another with the purpose of coupling them to one another.

Detection system 20, as shown in FIG. 1, comprises a primary approach emitter E1 mounted upon the main object B. Emitter E1 directs a primary approach signal toward the target object A; this primary approach signal has a frequency F1 and preferably comprises an ultrasonic signal detectable over an effective range of 0 to 100 meters. Further, the primary approach signal F1 is preferably discontinuous, comprising a series of timed bursts at the signal frequency.

A primary approach receiver R1 is mounted on object A and is electrically connected to a response device D2. The response device D2 is in turn electrically connected to a secondary approach emitter E2 that generates and radiates a secondary approach signal back toward the main object B. The secondary approach signal is again an ultrasonic signal, but at a frequency F2 distinguishably different from the primary approach signal F1. The secondary approach signal F2 is also discontinuous in nature, comprising a timed sequence of bursts at the secondary ultrasonic frequency F2.

A secondary approach receiver R2 mounted upon the main object B intercepts the signal F2 radiated from object A. Receiver R2 is electrically connected to a call device D1 which contains the energizing control circuits for the primary approach emitter E1. Call device D1 includes a calibrator-comparator circuit for comparing the times of occurrence of the emission of signal F1 by emitter E1 and reception of signal F2 by receiver R2, thereby affording a measure of the distance between objects A and B.

The elements of system 20 as thus far identified, comprising call device D1, primary approach emitter E1, primary approach receiver R1, response device D2, secondary approach emitter E2, and secondary approach receiver R2, comprise approach detector means for determining the presence of object A and for measuring the distance L within an approach distance range, usually from about 3 to 4 meters up to a maximum of the order of 50 to 100 meters.

In addition to the approach detector meter described above, system 20 as illustrated in FIG. 1 includes proximity detector means for determining the distance L within a proximity distance range encompassing distances smaller than the approach distance rage, with some overlap between the two ranges. The proximity detector means includes proximity emitter E3 which generates a coherent light beam that is radiated from the main object B toward the target object A. This primary proximity signal is deflected, by suitable scanning means, back and forth through a limited scanning angle SC.

The proximity detection means includes proximity responder means on object A for receiver the primary proximity signal and radiating back toward object B a secondary proximity signal. In the system illustrated in FIG. 1, the proximity responder means comprises two reflectors S1 and S2. These reflectors reflect the optical proximity signal back to a proximity receiver R3 mounted on the main object B. The proximity detector means also includes a time comparator, not shown in FIG. 1, for comparing the elapsed time between reception of the return signals from reflectors S1 and S3, at receiver R3, which affords an indication of the distance L between objects A and B.

A range switch RS is included in system 20 and is coupled to the two comparators in the approach and proximity detectors. Because range switch RS receives the distance information from both comparators, it is able to produce an output indicative of the distance L within a comprehensive distance range encompassing both the approach range of about 50 to 100 meters and the prosimity range, which is usually about 4 to 5 meters. Thus, the approach detector means can be employed to detect the presence of object A at the outer limits of the approach range, and to measure the distance L within that range until the objects are within the much shorter proximity range, after which the range switch RS switches over to use the proximity detector data. The distance signals are applied to a pilot device P, which may comprise an ordinary indicating instrument or may constitute a control for controlling the drive of the main object B.

In its operation, the range switch RS may be constructed to afford some hysteresis to avoid frequent range switching near the limit value between the two measurement ranges.

Taking various physical parameters into consideration, such as normal absorption, molecular absorption, damping due to the source, as well as possible absorption of signals by fog, the recommended frequencies F1 and F2 for the approach detector means lie between about 18 and 26 Khz. As noted above, emission is discontinuous in the approach detector means, affording a delay parameter t discussed more fully hereinafter. To reduce the influence of noise to a minimum, in operation of the approach detector means, reception by receiver R2 is limited to predetermined periods called reception windows. The same technique is applied to operation of receiver R1 on target object A.

More particularly, the primary approach signal F1 emitted by device E1 is a train of impulses enduring for a predetermined time interval. The emission rate is variable and is determined by the following factors:

frequency F1 (or F2 for emitter E2);
emission power;
width of impulse train;
direction ratio; and
positioning of the detection axis.

Only the release timing of the train of impulses comprising the primary approach signal F1 and its power are varied when system 20 is in operation; the other parameters are initially selected and maintained fixed.

For the primary approach emitter E1, it is advantageous to use an ultrasonic piezoelectric transducer of the VALVO type, supplying an output, under utilization conditions given above, of about 350 db. These dynamics may be increased by fitting the emitter transducer with a reflector, such as an ellipsoidal reflector, the transducer being located at one focus of the ellipsoid. To promote effective and precise operation of the approach detector means of the system, it is advantageous to use approach signals of quite short duration. Satisfactory results are obtained using signal bursts comprising about 10 oscillations each, both for the primary approach signal at frequency F1 and the secondary approach signal at frequency F2. For example, then, assuming frequency F1 to be 18 Khz and frequency F2 to be 23 Khz, the emission durations for the bursts in each of the two signals, for 10 oscillations each, are:

$T1 = 0.55$ microseconds at F1
$T2 = 0.44$ microseconds at F2.

Although constant power emissions are possible, it is preferable to provide emissions of variable power, by power servo-control of the emission amplitude.

Asynchronous operation of system 20 may give rise to erroneous response noise, which would completely falsify the determination of distance L by the approach detector means. To limmit this noise response, operations should be carried out at a minimum power level and at a constant reception level. However, if the emission power is not controlled to compensate for variations in external physical parameters, the signal may vary considerably. Accordingly, it is desirable to afford a power servo-control which selects a signal amplitude among a limited number of possible amplitudes; in the more specific description of system 20 provided hereinafter, provision is made for selection between three signal levels.

Figure 3:
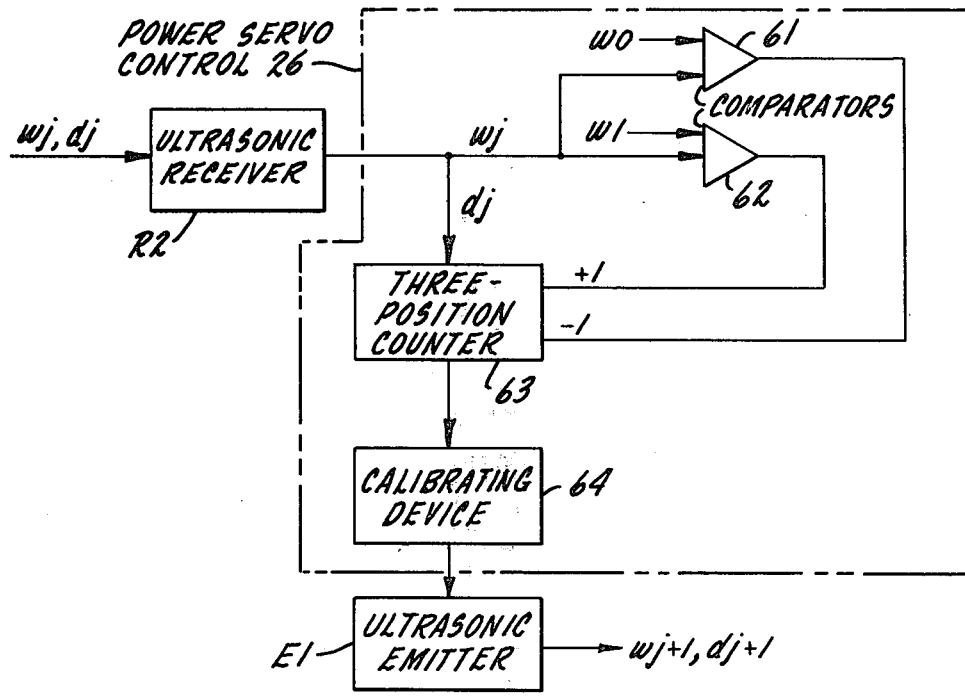
FIG. 3 is a block diagram of the power servo-control of FIG. 2.

FIG. 3 illustrates one embodiment of a power servo-control 26 which may be incorporated in call device D1 (FIGS. 1 and 2) to control operation of the primary approach emitter E1; a similar servo-control 26' is employed for the secondary approach emitter E2. In the particular case shown, the control 26 provides for emission of three different signals having an emission duration $dj$ and a power level $wj$. Durations of 1.3 to 5 milliseconds are envisaged.

Power servo-control 26, according to FIG. 3, comprises two comparators 61 and 62 for the signal ($wj,dj$) received by the secondary approach receiver R2. In the comparators 61 and 62, the level $wj$ is compared with two constant input signals at levels $wo$ and $w1$, respectively.

On the basis of this comparison, one of three cases is encountered.

If $wj$ is less than $wo$, comparators 61 generates an output signal applied to a three-position counter 63 to cause the counter to count down one count.

If $wj$ lies within the range between $wo$ and $w1$, reception is correct and the state of counter 63 is not modified.

If $wj$ is greater than $wl$, reception is too strong and the comparator 62 generates an output signal that is applied to counter 63 to cause the counter to count up one count.

The state of the count in counter 63 controls the calibrating device 64 by selecting one of the three signals ($wj, dj$). The signal parameters selected are transmitted to the emitter E1 by a calibrating device 64 which supplies the corresponding signal amplitude and duration.

Figure 2:
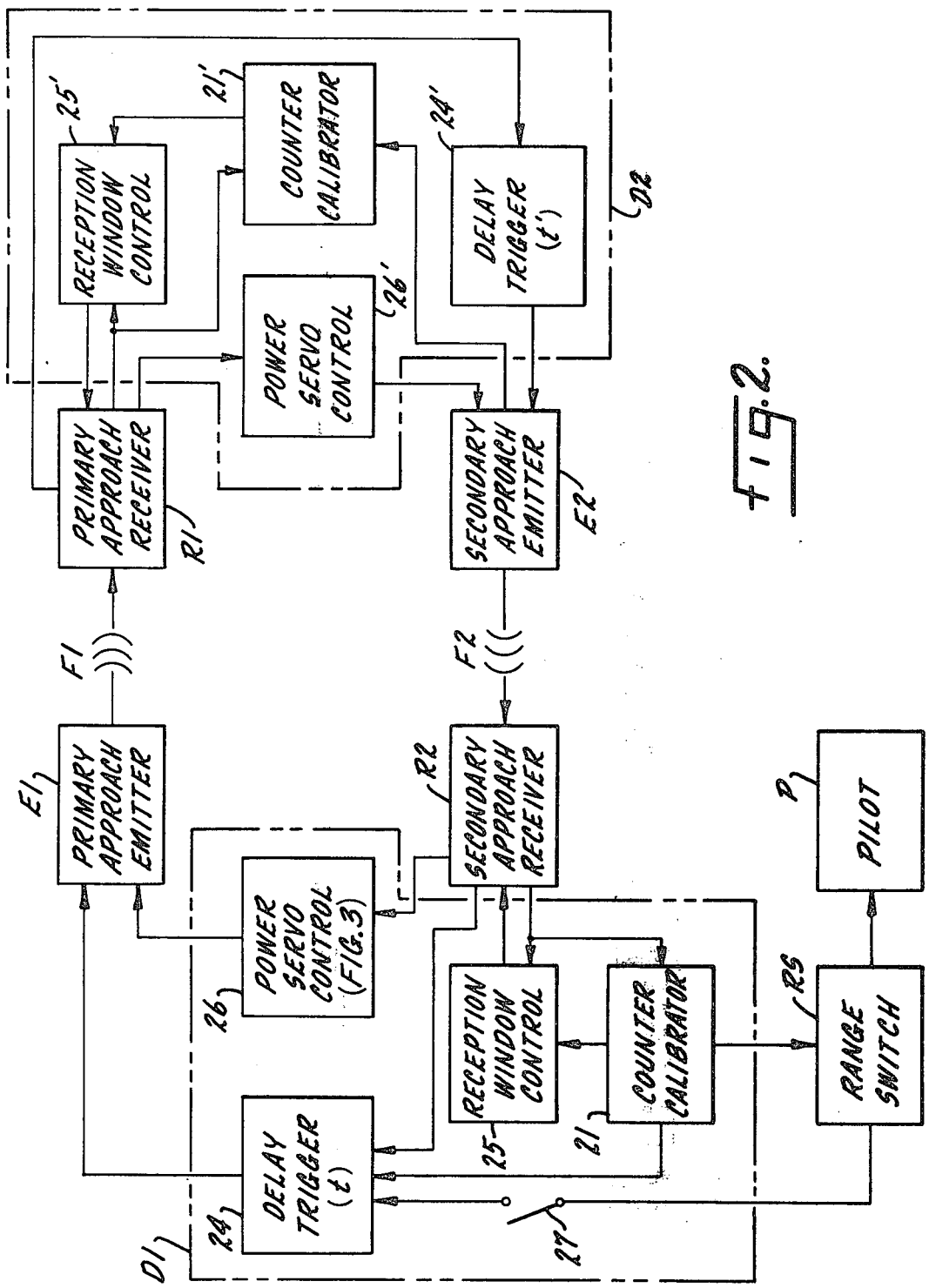
FIG. 2 is a more detailed block diagram of one embodiment of approach detector used in the system of FIG. 1, comprising a call device and a response device.

FIG. 2 illustrates the approach detector means of the system somewhat more completely, including particularly the basic units for call device D1 and response device D2. As shown therein, call device D1 comprises a delay trigger circuit 24 which is utilized in conjunction with the power servo control 26 in the control of the ultrasonic primary approach emitter E1. Delay trigger 24 has inputs from the secondary approach receiver R2, from the counter calibrator 21, and from the range switch RS. A reception window control 25 is incorporated in device D1 to control the intervals in which receiver R2 is operational. The window control 25 has an input from receiver R2 and a second input from the counter calibrator 21; circuit 21 also receives an input from receiver R2. The counter calibrator 21 (see FIG. 3 and 6) is the comparator device used for distance determination and has another output connected to range switch RS.

As shown in FIG. 2, response device D2 is very similar in construction and organization to call device D1 except for the omission of connections to an external range switch. Thus, the response device D2 includes a reception window control 25' for the primary approach receiver R1, a counter calibrator 21', and a power servo control 26', together with a delay trigger circuit 24'. As in the call device, delay trigger 24' and power servo control 26' control the operation of the ultrasonic emitter E2 that is employed as the secondary approach emitter.

In considering the operation of the approach detector means as illustrated in FIG. 2, it may be noted that initiation of operation is controlled by a switch 27 connected in the circuit from range switch RS to delay trigger 24. Thus, the delay trigger can be actuated either by an input signal from switch RS, or from an input derived from receiver R2 or calibrator 21. When receiver R2 actuates delay trigger 24, the latter in turn actuates the primary approach emitter E1 to produce an ultrasonic emission at the frequency F1 for a period having a duration $t$.

On the other hand, trigger 24 may also be actuated by an input signal from calibrator 21 to trigger the primary approach emission after a time $T_o$ (for example, $T_o = 0.35$ milliseconds) corresponding to a maximum uninterrupted time of reception. Control by the counter calibrator 21 is exercised when the target object A is not within the detection range of the approach detector means and there is no return signal received by receiver R2. Whenever the target object A is in range, and the receiver R2 coupled to call device D1 receives a secondary approach signal F2, indicating the presence of object A, control of trigger 24 is exercised by the output signals from receiver R2. In a particular selected case, it may be assumed that the interval $t$ established by delay trigger 24 is ten milliseconds.

The receivers R1 and R2 are band pass receivers, their reception dynamics, as well as positioning and directionality, being limited to signals F1 and F2 respectively. Starting from the general formula:

$$f_c = f_e \times \frac{c\ v_r\ w}{c\ w}$$

in which, $f_c$ = emitter frequency
$f_e$ = receiver (Doppler) frequency
$c$ = velocity of sound
$v_r$ = relative velocity of emitter and receiver
$w$ = wind component along the emission axis one obtains:

$$\frac{\Delta f}{f_e} = \frac{v_r}{c + w}$$

In the following particular case:
$v_r$ = 5 meters per second
$c$ = 320 meters per second (minimum velocity)
$w$ = 30 meters per second
one obtains:
$\Delta f = 0.02\ f_e$
The following pass-bands are selected:
17.6 KHz < F1 < 18.4 KHz for receiver R1
22.5 KHz < F2 < 23.5 KHz for receiver R2
The particular band pass filter constructions adopted to limit the frequency response bands of the receivers R1 and R2 are not critical; any conventional band pass filters may be employed as desired.

FIG. 4 illustrates one construction that may be used for the counter-calibrator 21 that actuates the reception window control 25 (FIG. 2). As shown therein, the counter-calibrator 21 may comprise an oscillator 51 having an output coupled to a frequency divider 55 having a division factor K; thus, taking the output frequency of oscillator 51 as F, the output frequency of circuit 55 is F/K. The division factor K is not unduly critical; a factor of four to eight may be utilized. The output of multiplier 55 is supplied, through a gate AND 1, to a plural-stage counter 52 having a plurality of outputs connected to corresponding stages in a reverse counter 53. Counter 53 also receives an input from oscillator 51, through a gate AND 2. Another output from counter 52 is coupled to a detector 56 in turn connected to delay trigger 24 and reception window control 25 (FIGS. 2 and 6). The individual stage outputs of counter 52 are also coupled to the individual stages of a memory register RM that is connected to the pilot device P. The several stages of the reverse counter 53 are all connected to a zero detector 54.

When gate AND 1 receives an enabling input, as described hereinafter in connection with FIG. 6, the gate is opened and an input signal at frequency F/K is supplied to counter 52. On each cycle of the signal at frequency F/K, the count in counter 52 is increased by one. The count in counter 52 increases during the complete interval in which gate AND 1 remains enabled. When the input to gate AND 1 reverts to a non-enabling condition, and the gate is closed, the total count in counter 52 is transmitted in parallel to the reverse counter 53, previously in a zero count condition, so that the reverse counter 53 now includes a total count corresponding to the final count in counter 52.

In the next phase of operation, when an enabling input is again supplied to gates AND 1 and AND 2, an input signal is supplied to reverse counter 53 at the oscillator frequency F, which is substantially higher than frequency F/K. The input signal to counter 53 from oscillator 51, through gate AND 2, causes counter 53 to count down from the count previously recorded in counter 53 from counter 52. When counter 53 reaches a count of zero, this null condition is detected by detector 54, which may be a simple multiple-input NAND gate that produces an output signal whenever all of the inputs thereto are at zero value, indicating no count stored in any stage of counter 53.

Because the input frequency F to reverse counter 53 is substantially higher than the input frequency F/K to counter 52, the reverse counting operation performed by counter 53 proceeds much more rapidly than the counting operation in counter 52. Thus, the reverse counter 53 is always in its zero condition, ready to receive a new count from counter 52, prior to the end of the counting operation performed in counter 52.

Counters 52 and 53 work in offset relation to each other. When counter 52 is counting the impulses at frequency F/K received during an open window condition as described below in connection with FIG. 5, the reverse counter 53, which has received the prior count from counter 52, performs its reverse counting operation. The limited offset in time between operations of the two counters is not critical because the counting and reverse counting operations (and accordingly, the zero detection by circuit 54) are performed in rapid succession so that the change in distance between the two vehicles that may occur is quite small. Even if the distance between the two vehicles decreases rapidly, the counting operation performed by counter 562 always lasts longer than the reverse count performed in counter 53.

AS a specific example, during a given window interval counter 52 may receive a total count of 100. At the end of this counting operation, when the enabling signal to gate AND 1 is interrupted, the count of 100 is transferred to reverse counter 53. Subsequently, when gates AND 1 and AND 2 are opened, counter 52 may receive a total count of 90 pulses (it is assumed that the vehicles are closing on each other). Because of the frequency division effected in circuit 55, the time in which the new count of 90 is recorded in counter 52 is considerably longer than the time required for counter 53 to count down to zero from the count of 100 previously recorded therein. Thus, the zero condition for counter 53 is detected by circuit 54 before the next counting operation occurs.

Counters 52 and 53 may be of known construction, each comprising a series of conventional J-K flip-flop circuits. This is also true of register RM. The reset circuits for counter 52 and register RM may be of conventional type and have not been illustrated; counter 53 is effectively reset in each countdown operation.

In order to insure that the approach detector means of system 20 does not respond invariably and indiscriminately to all signals received in the ultrasonic range, which could result in continuous emission and reception of erroneous information, a limitation is imposed upon the times during which the ultrasonic receivers R1 and R2 are operational. This limitation takes into account preceding measurements and also takes account of the dynamics of the moving object B and, if necessary, of the target object A. Thus, transmission and reception are limited to a series of intervals or windows of limited duration in order to eliminate to the greatest extent possible the reception of noise without, however, allowing a proper approach signal to escape undetected.

The functional requirements for the window control of the approach detector receivers R1 and R2 are illustrated graphically in FIG. 5. In FIG. 5, time T1 represents the time of emission of a signal burst comprising the primary approach signal from emitter E1. Based upon the dynamics of the objects A and B, the window in which the next signal should be received can be determined. It is thus sufficient to take the first reception into account and, as soon as this has been done, to terminate the first window interval and interrupt reception at receiver R2. This operation is effected, as indicated in FIG. 2, by means of the output signal from receiver R2. The overall time sequence is illustrated in FIG. 5.

When call device D1 is in operation as a presence detector, before any secondary approach signal F2 has been received at the receiver R2, receiver R2 is maintained in continuous operation. As soon as the first return signal has been received, the window is effectively closed and the timing for opening for the next sequence of operations is initiated. The transition from normal approach distance measurement operation to the detection of presence of the target object A occurs whenever the object A is displaced farther and farther from object B or whenever the signal response disappears accidentally. The transition from presence detection to normal distance measurement operation, on the other hand, occurs either when a noise signal is detected by receiver R2 or when the target object A appears in the approach detection field for system 20. In the latter case, normal operation continues. For a noise detection, since it is practically impossible for additional noise to pass through the window-controlled receiver R2, the approach detector changes its operating mode and again goes to the presence detection mode of operation.

Referring again to FIG. 5, it is seen that emitter E1 (on object B, see FIG. 1) emits a primary approach signal at frequency F1 over a period of time T1 preferably encompassing ten oscillations as noted above. This signal is received, as indicated by the curve F1' in FIG. 5, by receiver R1 (on object A). The signal received at receiver R1 actuates the responder D2 and causes the emitter E2 to emit a secondary approach signal at frequency F2 over a period having a duration T2, following a time delay $t'$. The secondary approach signal is subsequently received by the receiver R2, as indicated by the curve F2', and is applied to the call device D2 to control the emission of a new signal of frequency F1 following a time delay $t$. If $x$ is the time between the initial emission of signal F1 and the initiation of the signal reception F2' at receiver R2, the distance $L$ between objects B and A may be determined as:

$$L = \frac{(x - t') c}{2}$$

where $c$ = the velocity of sound. In order to compensate for the influence of temperature on the velocity of sound, a temperature signal TH may be applied to oscillator 51 of counter calibrator 21 to adjust the basic oscillator frequency; see FIG. 6. Other adjustments for additional environmental factors that may affect the propagation velocity of sound (e.g., humidity) can be made in similar manner.

FIG. 6 affords a more complete and detailed illustration of individual devices which may be utilized in the approach detector call device D1, with some repetition of material from the earlier figures, particularly FIGS. 2 and 4. As shown in FIG. 6, receiver R2 comprises an ultrasonic transducer R2', which may constitute a piezo-electric microphone or an electret microphone. The output of transducer R2' is connected to the input of an operational amplifier PA having a band-pass filter and pulse-shaping circuit FB connected to its output. The operational band-pass characteristics for filter FB of receiver R2 are described above; a Tchebitschef filter of the seventh type may be utilized. The waveshaping characteristics are equally non-critical; circuit FB generates an output pulse representative of the amplitude of the received signal. A relatively simple rectifier circuit can be used as the wave-shaping portion of circuit FB.

The output signal from circuit FB is supplied to a mono-stable trigger circuit M2 which is a part of delay trigger circuit 24. Trigger circuit M2 has a time delay period $t$ (see FIG. 5). One output of trigger circuit M2 is connected to one input of a gate OR2 in the delay trigger circuit 24. Another output from trigger circuit M2 is connected to one input of each of the two gates AND1 and AND2 in the counter-calibrator 21.

The output circuit FB of receiver R2 is also connected to the counter 52 in the counter-calibrator 21 and to the power servo control 26 (see FIG. 3). Further, the receiver output circuit FB is connected to one input FER of a time-delay flip-flop circuit BA. Circuit BA has an output connection to a gate FN in the receiver R2 that is connected to the input of the amplifier PA.

The gate OR2 in the delay trigger circuit 24 has a second input derived from the detector 56 of the counter-calibrator 21. The output of the gate OR2 is connected to a monostable trigger M1 is having a time delay period T1 (see FIG. 5). The output of the trigger circuit M1 is connected to one input of an AND gate P1 in the emitter device E1. A second input to gate P1 is taken from an oscillator 01 having an operating frequency (F1) in the ultrasonic range, as described above.

The emitter E1, in the circuit of FIG. 6, includes a variable-power amplifier A1 having its input connected to the output of the gate P1. The output power level of the amplifier A1 is controlled by a signal from the power servo control 26 (see FIG. 3), in turn controlled by the reception input signal from the circuit FB. The output of the amplifier A1 drives a suitable electroacoustical transducer E1' that radiates a primary approach signal at the ultrasonic frequency F1.

The zero detector 54 in the counter-calibrator 21 has an output connection to a gate OR1 that is in turn connected to another input OUV of the flip-flop circuit BA. A second input to the gate OR1 is derived from the maximum distance detector 56 in the counter-calibrator 21. A thermal sensing device TD is connected to the oscillator 51 in the counter-calibrator 21, through an amplifier A2, to supply a temperature signal TH to the oscillator that adjusts the oscillator frequency in accordance with variations in ambient temperature.

In considering operation of the call device D1 as illustrated in FIG. 6, it is convenient to start with the assumption that an ultrasonic secondary approach signal at frequency F2 impinges upon the transducer R2' at a time when the amplifier PA is enabled. The output signal from the transducer R2' is amplified by device PA and supplied to circuit FB, which generates an output signal pulse supplied to the circuits M2, 26, and 52, and to the FER input of the flip-flop BA.

The signal from the circuit FB sets the flip-flop BA to produce an output signal to the gate FN, which may comprise a conventional field-effect transistor gate. The gate FN effectively disables the amplifier PA in the receiver R2, as by grounding the amplifier input. As a consequence, the receiver R2 is effectively shut off; the reception window is closed (see FIG. 5).

The reception signal output of the circuit FB sets the monostable trigger circuit M2, which interrupts the enabling signal otherwise supplied from the circuit M2 to the gates AND1 and AND2 in the counter-calibrator 21. This cuts off the inputs to the counters 52 and 53 from the counter-calibrator oscillator 51, and interrupts the counting operations in the circuits 52 and 53. The signal from the receiver output circuit FB applied to the counter 52 actuates the counter to transfer its total count, indicative of the quantity $x$ (see FIG. 5 and foregoing explanation of FIG. 4) to the reverse counter 53 and to the memory register RM. It may be desirable to afford a brief time delay in the signal from the circuit FB, as applied to the counter 52, and to utilize the undelayed signal from the circuit FB to clear the register RM prior to the transfer of a new distance-representative count from the counter 52.

After a given time interval $t$ (see FIG. 5), the monostable trigger M2 resets itself. When this occurs, the other monostable trigger M1 is set, through the gate OR2, supplying an enabling signal to the gate P1 in the emitter E1. This initiates the transmission of a primary approach signal, at the frequency F1, which endures until the trigger circuit M2 resets itself, after a time interval T1 (see FIG. 5). The interval T1 is selected to provide for transmission of a short "burst" of the ultrasonic primary approach signal, which may include about ten cycles at the frequency F1 as described above.

When the trigger M2 resets, it again supplies an enabling signal to each of the gates AND1 and AND2, starting a new counting cycle in the counter-calibrator 21. The counter 52 counts up at the frequency F/K, having been reset to zero by the signal from the circuit FB as described above. The counter 53 counts down from the prior distance count at the higher frequency F.

When the counter 53 reaches zero, this condition is detected by the circuit 54, which the applies a reset signal to the OUV input of the flip-flop BA reset, the output signal to the gate FN in the receiver R2 is interrupted, again enabling the amplifier PA and re-opening the reception window by restoring the receiver R2 to operation.

Subsequently, the further primary approach signal emitted by the emitter E2, as described above, causes the call device D2 on the target object A to transmit a further secondary approach signal, at frequency F2, back to the call device D1 on the main object B. This starts a new cycle of operation, which proceeds as described above.

It should be noted that the counting operation in the main counter 52 starts when the gate AND1 is enabled, corresponding to the time that the trigger M1 is set to initiate emission of a primary approach signal F1, and ends when the gate AND1 is disabled, corresponding to reception of a secondary approach signal F2, so that the total count reached in the counter 52, in each cycle of operation, is a measure of the distance L between the objects A and B (FIG. 1).

For presence detection operation, the detector 56 supersedes the control functions exercised by the receiver R2 and the reverse counter 53 during approach measurement operations. The detector 56 is set to detect a given preset count, in the counter 52, that is representative of the maximum effective range of the approach detection system, relative to the reverse count operation in the counter 53. Whenever the detector 56 detects that preset count in the counter 52 before the counter 53 has counted down to zero, the detector 56 applies a reset signal to the OUV input of the flip-flop BA, thus superseding operation of the zero detector 54 and actuating the control 25 to open the reception window by activating the receiver R2. The reception window control 25 thereafter maintains the receiver R2 continuously operational until a secondary approach signal, indicative of the presence of a target object within the approach range of the system, is intercepted by the receiver R2.

The detector 56 also supplies an actuating signal to the trigger M1 to initiate a new primary approach signal emission as described above. Because the trigger M2 is not set, there being no setting signal available from the receiver R2, the counting functions in circuit 21 continue; when the counter 52 re-cycles and again reaches the preset count for the detector 56, that detector again initiates a further primary approach signal emission. In this manner, the primary approach signal is emitted periodically and the receiver R2 is held "open" (operational) continuously until a secondary approach signal is actually received, at which time the system changes from its presence detection mode of operation to its approach measurement mode as described before.

The frequency of the oscillator 51 and the capacity of the basic distance counter 52 in the counter-calibrator 21 are selected in accordance with the range requirements for approach detection operation. If the lower limit for the approach detection range is taken as four meters, the distance error corresponding to a single erroneous count, plus or minus, may be held to one percent, at the minimum end of the range, by selecting a counting step equivalent to four centimeters. For this level of accuracy, the base frequency of the oscillator 51 may be shown to be approximately 4.25 KHz; the capacity of the counter 52 is then made sufficient to store a distance count somewhat higher than the maximum desired for the approach range.

The count in the counter 52 results in a measure of the distance L only within the limits of the capabilities of the system. When the count is made under normal operating conditions, as described, the emission by the primary approach emitter E1 is effected at a variable rate, and each window is calibrated in accordance with the preceding distance measurement. On the other hand, when the system is operating as a presence detector, emission takes place at a fixed rate and there is no distance count.

The response device D2 (FIG. 2) has a structure which is substantially equivalent to that of the call device D1. It thus comprises a receiver $R_1$ receiving the primary approach signal at the frequency $F_1$. This reception is controlled by a "reception window" device 25' corresponding to device 25. The signal received is sent to the counter calibrator 21' which also controls the window 25'. The emission of the frequency $F_2$ by the emitter $E_2$ is controlled by a delay trigger circuit 24' receiving only a signal from receiver $R_1$ and controlling the emission of its emitter $E_2$ with a delay $t'$. Lastly, the emitter $E_2$ can be power servocontrolled by the device 26'.

According to the mode of embodiment represented in FIG. 2, the responder device D2 does not include a range switch which can send a command to a pilot or switch a proximity detector. In specific cases, particularly if both the target object A and the main object B are to be in motion and piloted at the same time, it can be advantageous for the responder device D2 to be exactly identical with the call device D1. This latter approach has advantages, particularly in regard to the manufacture of the call devices and the responder devices, since identical instruments are employed.

When the distance L between the objects A and B is below a given limit (e.g., 4 meters), the range switch RS (FIG. 1) switches from the approach detector to the proximity detector.

Figure 8:
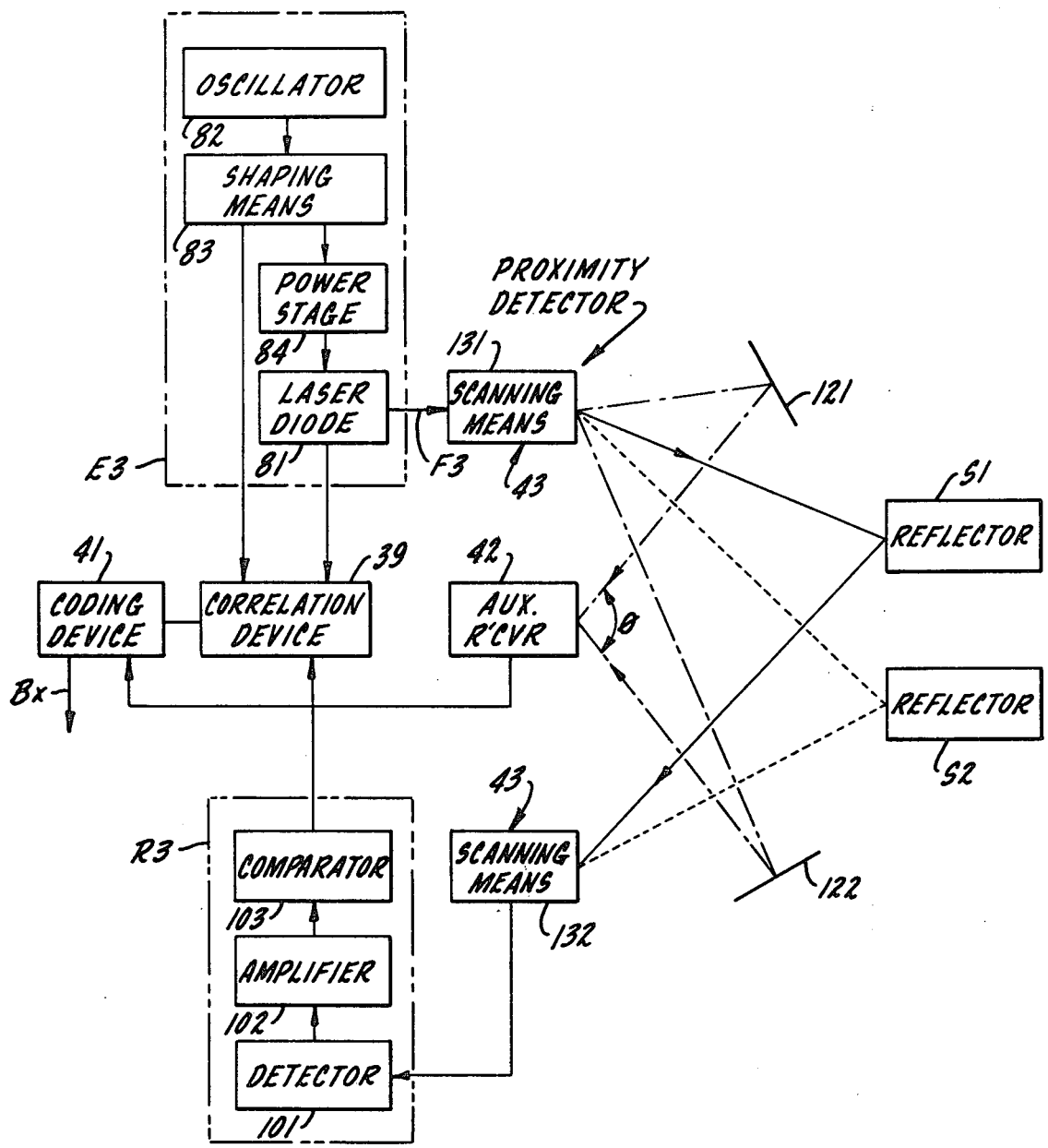
FIG. 8 is a block diagram of the proximity detector, shown in greater detail than in FIG. 7.

The proximity detector of system 20, represented in a general manner in FIG. 1, also is the subject of FIGS. 7–12. FIG. 7 shows various geometric data taken into account in the operation of the proximity detector, while FIG. 8 is a block diagram of this detector means.

According to FIG. 7, the proximity detector comprises an emitter E3 and a receiver R3. The emitter sends an optical scanning signal from object B to object A, where that signal successively strikes the two reflectors S1 and S2. The reflectors return the signal to the receiver R3. Measurement of the time separating reception of the two reflected signals from S1 and S2, respectively, as detected at receiver R3, enables the distance L between the target object A and the main object B to be calculated, as explained hereinafter. In the present case, the proximity detector is intended to operate over a proximity range of zero to five meters.

The proximity detector comprises a scanning call device, formed by the emitter E3, the receiver R3, and a scanning means 43, together with other components, as shown in FIG. 8. The emitter E3 includes an optical radiation source, such as a laser diode 81, and electronic circuits for controlling the emission from this source. The light source 81 may, for example, comprise laser diode of the gallium arsenide type, emitting radiation with a wave length of 9050 A. This wave length, which is outside the visible spectrum, has a certain number of advantages and avoids much noise. The power rating of diode 81 for example, may be 1 to 5 watts.

The control electronics of emitter E3 are intended to provide diode 81 with the energy required for emission. The duration of the emission should be as short as possible; an emission duration of the order of 100 nanoseconds repeated, for example, every 100 microseconds, can be utilized.

In detail (FIG. 8), the emitter E3 comprises, in sequence, an oscillator 82, a circuit 83 for shaping the output of oscillator 82 to afford a rectangular wave output, and a power stage 84 directly controlling the laser diode 81. The laser diode 81 used in the emitter E3 may have, for example, an emission slit 2.2 A wide and 0.2 to 0.4 mm long. With such a diode a particularly accurate light beam is produced, which is well suited to scanning detection.

The proximity detector apparatus shown in FIG. 8 is able to satisfy very severe utilization conditions. It is possible however, when conditions are less rigorous, to use a less precisely controlled light source, such as an incandescent filament lamp, a discharge lamp, or an electroluminescent diode.

Figure 9:
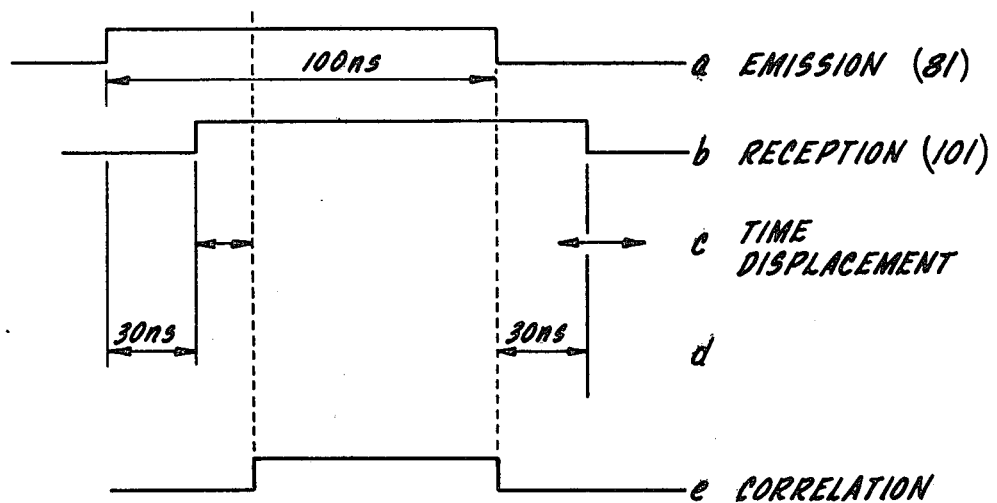
FIG. 9 is a timing chart for the emission and reception signals of the proximity detector of FIGS. 7 and 8.

In the case of a laser diode, the signals emitted and received can be as represented in FIG. 9. The curve $a$ in FIG. 9 represents the signal emitted by the diode 81, and the curve $b$ is the signal received at a detector 101 (see FIG. 8), spaced in time with respect to the emitted signal. The time relation of the received signal to the emitted signal is subject to variations, as shown by the double arrows in line c. In FIG. 9, the received signal $b$ has been shifted, with respect to the emitted signal $a$, by the longest distance envisaged for operation of the proximity detector of the system, and corresponds to a propagation distance of four meters. This corresponds to a time of 30 nanoseconds.

Lastly, in FIG. 9 the line $e$ represents the correlation between the primary proximity signal emitted from emitter E3 and the secondary proximity signals received at receiver R3, that is, the interval during which the signal is simultaneously emitted and transmitted.

Correlation between emission and reception is obtained by the correlation device 39 (FIG. 8), which receives input signals from the circuit 83 that actuates the emitting diode 84 and from the receiver R3.

The receiver R3 receiving the reflected signals from the reflectors S1 and S2 comprises the detector 101, which may be a photosensitive element, for example, a photodiode of the PIN MOTOROLA MRD 500 or MRD 510 type, which has a short response time and a great sensitivity to emitted radiations. Diode 101 is connected to a rapid-acting, low level amplifier 102 which is connected to a comparator 103 supplying a synchronous detection signal to the correlation device 39. To minimize noise, the receiver R3 includes a narrow pass band filter corresponding to the frequency of the emitter signal E3.

The result of the correlation (FIG. 9e) is edited in a slow circuit of the monostable type, transforming the duration of the signal from 30 to 100 ns, each 100 ns cycle signal constituting a logical signal "one." In the case where the system is operating in a medium in which there is a substantial amount of noise, the correation device 39 is fitted with an impulse counter which supplies a logical one signal only if the result of the correlation which it receives lies between acceptable limits.

The signal thus formed is sent to a coding device 41 which forms the signal Bx corresponding to the distance L.

Figure 10:
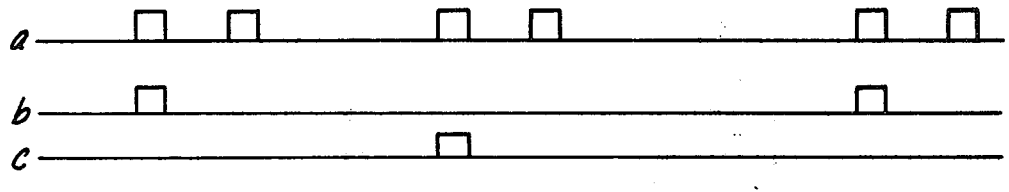
FIG. 10 is a timing chart for the pulses in the principal receiver and the auxiliary receivers of the proximity detector.

In order to make it possible to regulate the distance between two vehicles by servo-control means, it is important to provide a theoretical zero position around which this servo-control operates. To this end, the proximity detector means (FIG. 8) may be provided with an auxiliary receiver 42 which directly receives the signals emitted by the emitter E3 during scanning, the beam being sent back by two fixed reflectors 121, 122 carried by object B and defining the servo-control position by a real zero. These reflectors are mounted on the main object B, preferably integral with the emitter E3, their angular positions being adjustable. FIG. 10, at a, represents the signal received by the principal receiver R3, and at b and c, the signals received by the auxiliary receiver 42.

The manner in which the distance between the objects A and B is computed may be understood by referring to FIG. 7. In this figure, L is the distance from the plane of the emitter E3 and receiver R3, on object B, and the plane of the reflectors S1 and S2, on object A, whereas d is the distance between S1 and S2, and ε is the angle at which S1 and S2 are seen from R3. Whence:

$$L = \frac{d}{2} \cotan \frac{\epsilon}{2}$$

But, if 2ω is the scanning velocity, $\epsilon = 2\omega\Delta t$, $\Delta t$ being the time required to scan between S1 and S2. Whence:

$$L = \frac{d}{2} \cotan \omega \cdot \Delta t$$

The measure of distance L thus in fact means the measurement of the time $\Delta t$.

The responders (reflectors) S1, S2 of the proximity device are, for example, simply constituted by reflecting surfaces and in particular catadioptric reflectors or other retro-reflector devices. These devices have the property of exactly reflecting a light beam in the incident direction. This avoids virtually all problems of alignment of the reflectors with the emitter. To increase operating reliability, it is advantageous to have the reflectors parallel to the scanning axis and slightly curved to compensate for any bad alignment that there might be.

Figure 12:
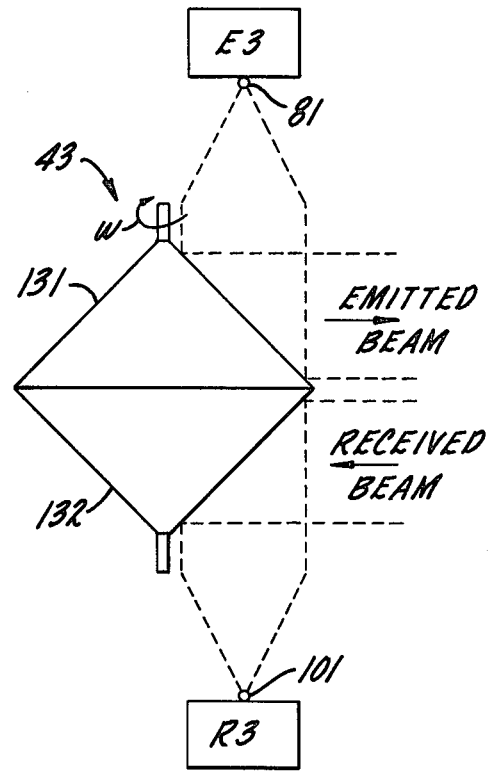
FIG. 12 is a side view of the scanning device showing the optical beams emitted and received.

The scanning means 43, shown in FIGS. 8 and 12, receives the beam of the emitter E3 (diode 81 in FIG. 3) and makes it describe a scanning arc with a velocity ω/2. As there is a time overlap between the signal emitted and the signal received, it is advantageous to make the receiver R3 rotate in an indirect manner, as also the emitter E3. To combine these two scanning operations, there is provided, according to the invention, a rotating double mirror 131,132 (FIG. 12). Each mirror is constituted by a reflecting surface, defined as being the intersection of two planes and of a cylinder, the planes having the same inclination with respect to the axis of rotation.

The two devices 131 and 132 are combined with a diametrical section. The device assembly (131,132) is rotated uniformly at the scanning speed ω. In FIG. 12 the locations of the emitter E3 and the receiver R3 (detector 101 in FIG. 8) are shown, relative to devices 131 and 132. The direction of the emitted beam and that of the beam received are represented by two arrows. The scanning device 43, in addition, comprises optical means, such as lenses and filters, already known and not described in detail.

As a beam of substantially circular section is produced, it is advantageous to select the diameter of the scanning device 43 so that it is slightly greater than the diameter of the light beam that is emitted by emitter E3. Thus, when the device 43 comprises in fact two reflecting surfaces, it enables two scanning operations (emission and reception) to be carried out by rotation of the device.

Figure 11:
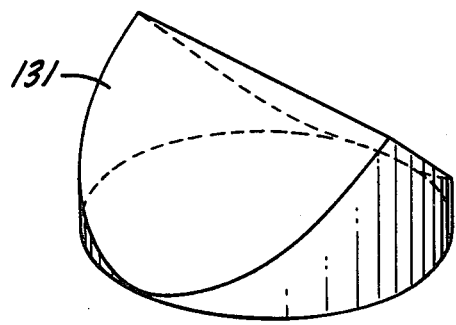
FIG. 11 is a perspective view of half of the scanning device of the proximity detector.

As it is advantageous to keep the speed of rotation ω as low as possible, the number of reflecting faces is increased. However, it is ordinarily not possible to go beyond a double-faced mirror such as is represented in FIG. 11, since the scanning field would not be sufficient in the particular case envisaged.

The coding device 41 may comprise, in simplest form, an integrator capable of integrating the output signals from the correlation circuit 39 to afford an output signal Bx having an amplitude representative of the duration of the input signal. Preferably, a constant-slope integrator circuit is employed. Thus, as explained below, the signal Bx can be utilized as a measure of the distance L (FIGS. 1 and 7) over the limited range of the proximity detection apparatus.

Figure 13:
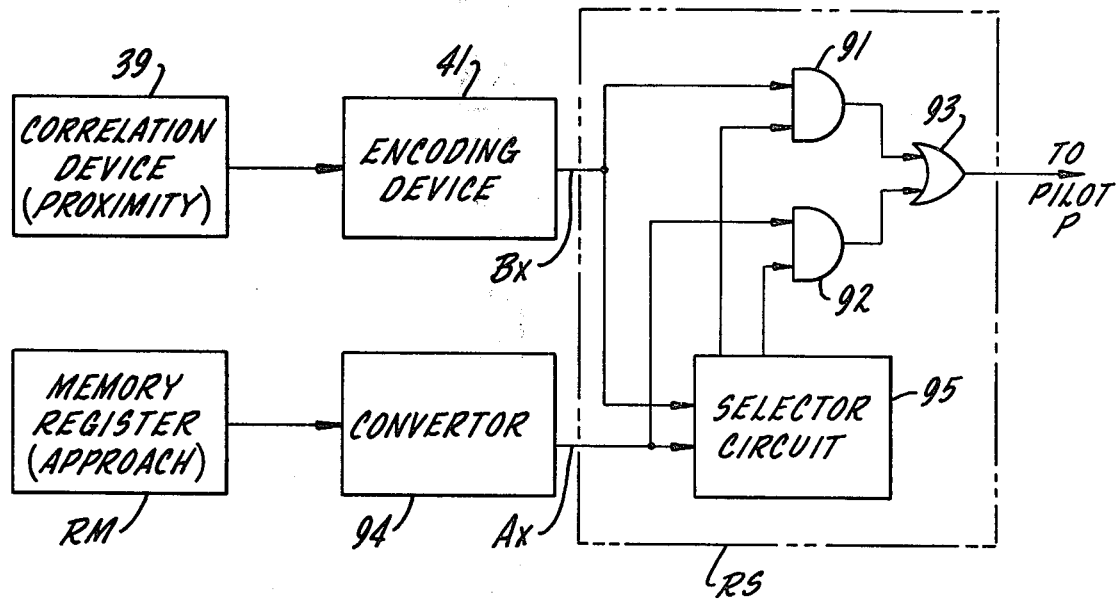
FIG. 13 is a block diagram of the coding and range switching circuits for the system of FIG. 1.

FIG. 13 is a block diagram illustrating the range switching circuits RS used to change operation of the system from the ultrasonic approach detector to the optical proximity detector and vice versa. As shown in FIG. 13, the output Bx of the coding device 41 in the optical proximity detector (FIG. 8) is connected to one input of an AND gate 91. The same signal Bx may be applied to one input of a selector circuit 95. The outputs of the gate 91 is applied to one input of an OR gate 93 that is coupled to the pilot device P.

The memory register RM of the ultrasonic approach detector (see FIG. 4) is connected to a converter circuit that converts the count in the register, representative of the distance between objects, into a signal Ax of the same form as the optical system output Bx. In this instance, the count in register RM is converted to a signal Ax having an amplitude representative of the count and hence representative of the distance; conversion can be effected by integration of a readout of the total count in the register, in conjunction with a conventional sample-and-hold circuit in the converter output, or by any other desired means. The convertor 94 and encoder 41 should be calibrated to afford essentially equal-amplitude outputs for distances in the overlap between the approach range and the proximity range (e.g., 4–5 meters).

The Ax output of the converter 94 is applied to a second AND gate 92 having its output connected to the gate 93. The Ax signal is also applied to the selector circuit 95. The selector circuit 95 has two outputs, each connected to an input of one of the gates 91 and 92. The output signals from the selector circuit 95 determine whether the approach signal Ax or proximity signal Bx is supplied to the pilot device P. This selection can be made in several ways. For example, the selector circuit may compare the approach signal Ax to a fixed voltage representative of a distance within the overlap of the approach and proximity ranges, supplying an enabling signal to gate 92 for values of A$x$ exceeding the fixed voltage and applying an enabling signal to gate 91 when A$x$ falls below the fixed voltage. Alternatively, operation of the selector 95 may be based on a similar arrangement for comparing the proximity distance signal B$x$ with a fixed voltage, or on a direct comparison of the signal B$x$ with a slightly attenuated signal A$x$.

The present invention is applicable in particular for piloting vehicles travelling on their own tracks, such as in a metropolitan transit system. The invention applies more particularly to a transport system in which the vehicles are required sometimes to follow one another with predetermined spacing, and must regroup at other times to form trains with no space between vehicles.

Figure 14:
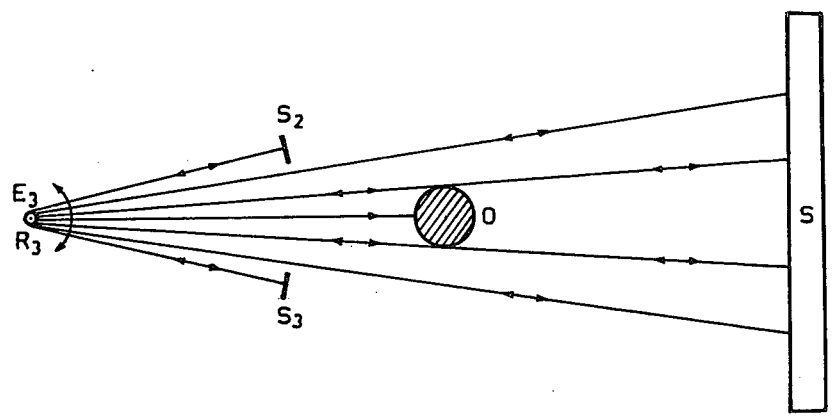
FIG. 14 shows diagrammatically the detection of the presence of an object with the aid of an optical device, according to FIG. 7.

FIG. 14 shows a particular case of the application of the present detector, according to the invention. The presence of an object OB had to be detected in the detection field of the device. Problems arise notably when the object OB is of small dimension by comparison with the field to be scanned.

According to the invention, use is made of the optical detector described above. The emitter $E_3$ scans a field by sending a luminous beam on the reflecting surface S which, for example, comprises a large-surface continuous catactioptric reflector for any scanning angle.

The detection of the presence of the object OB is effected not by the return of the light signal, as before, but by the shadow (absence of reflected beam) of the object OB. As before, the scanning field can be limited by two fixed reflectors $S_2$ and $S_3$.

The detection device to be used can be identical with that described in relation to the previous figures.

A particularly important application of the method described above relates, for example, to the automatic toll stations on roadways for detecting the passage of a passenger motorcar with or without a trailer, a truck with or without a trailer or a half-trailer. It is thus possible, with the means described above, to detect the presence of a shaft characterizing the attachment means of the trailer. But, the know optical means do not allow this result to be obtained because their resolving power is not sufficiently high or else because they require means which are extremely complicated, and uncertain of operation.

Of course, the invention is not limited to the examples of embodiment hereinabove described and illustrated. If necessary, other modes and other forms of embodiment can be envisaged without departing from the scope of the invention.

I claim:

1. A high-resolution system for detecting the distance L separating two objects A and B, either or both of which may be in motion, comprising:
    approach detector means including approach emitter on object B for radiating toward object A a primary approach signal of a first kind, approach responder means on object A for receiving the primary approach signal and radiating toward object B a secondary approach signal of said first kind, an approach receiver on object B, for receiving the secondary approach signal, and approach comparator means, coupled to the approach emitter and to the approach receiver, for comparing the times of emission of the primary approach signal and reception of the secondary approach signal to determine the distance L within an approach distance range;
    proximity detector means including a proximity emitter on object B for radiating toward object A a primary proximity signal of a second kind different from the approach signals, proximity responder means on object A for receiving the primary proximity radiation signal and radiating toward object B a secondary proximity signal of said second kind, a proximity receiver on object B for receiving the secondary proximity signal, and proximity comparator means, coupled to the proximity emitter and the proximity receiver, for comparing the times of emission of the primary proximity signal and reception of the secondary proximity signal to determine the distance L within a proximity distance range encompassing distances smaller than the approach distance range; and
    range switch means, coupled to the approach comparator means and the proximity comparator means, for developing an output indicative of distance L within a comprehensive distance range encompassing both the approach range and the proximity range.

2. A high-resolution distance detection system, according to claim 1, in which the approach signals and the proximity signals constitute different forms of radiation.

3. A high-resolution distance detection system, according to claim 2, in which at least one of the responder means on object A comprises:
    an intermediate receiver for receiving a primary signal from object B;
    and an intermediate emitter actuated by the intermediate receiver for radiating a similar but distinguishable secondary signal back toward object B.

4. A high-resolution distance detection system, according to claim 3, in which the intermediate emitter is constructed to generate and radiate a secondary signal having a different frequency from the primary signal received by the intermediate receiver, but in the same frequency spectrum.

5. A high-resolution distance detection system, according to claim 2, in which at least one of the responder means an object A comprises a reflector for reflecting a primary signal received from object B back, as a secondary signal, toward object B.

6. A high-resolution distance detection system, according to claim 1, in which the approach signals are ultrasonic signals and the proximity signals constitute electromagnetic radiation.

7. A high-resolution distance detection system, according to claim 6, in which the primary proximity signal is a coherent light beam, in which the proximity emitter includes scanning means for deflecting that beam along a predetermined scanning path, and in which the proximity responder means includes two reflectors mounted at spaced locations on object A, relative to the scanning path, to reflect two secondary proximity signals back toward object B.

8. A high-resolution distance detection system, according to claim 7, in which the primary proximity signal is generated by an oscillator-actuated laser.

9. A high-resolution distance detection system, according to claim 8, in which the proximity receiver on object B comprises a photodiode and filter means limiting light impinging on the diode to a narrow band encompassing that emitted by the laser, and further comrising scan-limiting means including two spaced auxiliary reflectors on object B for reflecting the laser beam back toward a given point on object B, and an auxiliary receiver located at that given point on object B for receiving laser beam signals reflected from the two auxiliary reflectors, limiting the angular extent of the scanning path to the spacing between the auxiliary reflectors.

10. A high-resolution distance detection system, according to claim 9, in which the scanning means comprises a double face mirror, on object B intermediate object A and object B, and means for rotating the mirror at a predetermined speed, the laser and the proximity receiver each being mounted in alignment with one face of the mirror.

11. A high-resolution distance detection system, according to claim 10, in which the mirror comprises two groups of two intersecting reflector planes each oriented at right angles to each other and at an angle of 45° to the axis of rotation.

12. A high-resolution distance detection system, according to claim 6, in which the approach responder on object A comprises an intermediate ultrasonic receiver responsive to a primary approach signal from object B, and an intermediate approach emitter actuated by the intermediate approach receiver for radiating an ultrasonic secondary approach signal back toward the approach receiver on object B, the secondary approach signal having a frequency substantially different from the primary approach signal, each emitter radiating short primary approach signal bursts separated by substantial quiescent intervals, the system further comprising means for actuating the primary approach emitter after a predetermined quiescent interval whenever no secondary approach signal is received at the approach receiver on object B and for actuating the primary approach emitter immediately after reception of a secondary approach signal.

13. A high-resolution distance detection system, according to claim 12, and further comprising reception window control means for deactivating the approach receiver on object B for a limited time interval immediately following each reception of a secondary approach signal, said limited time interval encompassing the period of radiation of the primary approach signal.

14. A high-resolution distance detection system, according to claim 6, and further comprising power servo control means, coupled to the approach receiver and the approach emitter, for adjusting the output amplitude of the approach emitter in response to variations in the strength of the received secondary approach signals relative to a predetermined standard and thereby compensate for variations in propagation conditions for the ultrasonic approach signals.

15. A high-resolution distance detection system, according to claim 6, in which each primary approach signal comprises a short burst of ultrasonic energy of given duration at a predetermined frequency followed by a substantially longer quiescent interval, and further comprising means for progressively decreasing the quiescent interval as the distance between the objects decreases.

16. A high-resolution distance detection system, according to claim 15, in which the approach comparator means comprises an oscillator of given frequency, a counter, and gate means for applying the output of the oscillator to the counter for a period initiated by emission of the primary approach signal and terminated by reception of the secondary approach signal, whereby the count in the counter is indicative of the distance $L$.

17. A high-resolution distance detection system, according to claim 16, and further comprising thermal sensor means for developing a temperature signal representative of ambient temperature, and means for applying the temperature signal to the oscillator to adjust the oscillator frequency for varying ambient temperatures.

* * * * *